US 12,485,966 B1

(12) United States Patent
Marble et al.

(10) Patent No.: US 12,485,966 B1
(45) Date of Patent: Dec. 2, 2025

(54) ACTIVE CAMBER CONTROL

(71) Applicant: GM Global Technology Operations LLC, Detroit, MI (US)

(72) Inventors: Robert Patrick Marble, White Lake, MI (US); Nate Maye-Bloom, Clawson, MI (US); Brian K. Saylor, South Lyon, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 19/223,264

(22) Filed: May 30, 2025

(51) Int. Cl.
*B62D 17/00* (2006.01)
*B60G 17/0165* (2006.01)
*B60G 17/019* (2006.01)

(52) U.S. Cl.
CPC ......... *B62D 17/00* (2013.01); *B60G 17/0165* (2013.01); *B60G 17/01908* (2013.01); *B60G 2200/46* (2013.01); *B60G 2400/0513* (2013.01); *B60G 2400/104* (2013.01); *B60G 2400/106* (2013.01); *B60G 2400/252* (2013.01); *B60G 2400/33* (2013.01); *B60G 2400/39* (2013.01); *B60G 2400/412* (2013.01); *B60G 2400/82* (2013.01); *B60G 2400/822* (2013.01); *B60G 2401/16* (2013.01); *B60G 2600/04* (2013.01); *B60G 2600/70* (2013.01)

(58) Field of Classification Search
CPC ................ B62D 17/00; B60G 17/0165; B60G 17/01908; B60G 2200/46; B60G 2400/0513; B60G 2400/104; B60G 2400/106; B60G 2400/252; B60G 2400/33; B60G 2400/39; B60G 2400/412; B60G 2400/82; B60G 2400/822; B60G 2401/16; B60G 2600/04; B60G 2600/70
USPC .......................................... 280/86.75, 86.751
See application file for complete search history.

(56) References Cited

U.S. PATENT DOCUMENTS

| 11,136,021 | B1* | 10/2021 | Funke | B62D 7/06 |
|---|---|---|---|---|
| 11,192,413 | B2* | 12/2021 | Brenner | B60G 7/008 |
| 12,280,825 | B1* | 4/2025 | Skynar | B62D 17/00 |
| 12,344,066 | B2* | 7/2025 | Choi | B60G 3/20 |
| 2014/0091538 | A1* | 4/2014 | Matsuda | B60G 17/0162 280/5.521 |
| 2015/0014956 | A1* | 1/2015 | Roland | B60G 21/007 280/124.128 |
| 2020/0223270 | A1* | 7/2020 | Kunkel | B62D 17/00 |
| 2022/0410871 | A1* | 12/2022 | Takeda | B60W 10/08 |
| 2023/0085585 | A1* | 3/2023 | Ryu | B60G 7/006 280/5.521 |
| 2023/0391392 | A1* | 12/2023 | Choi | B62D 65/04 |
| 2024/0001728 | A1* | 1/2024 | Ali | B60G 17/0165 |

(Continued)

*Primary Examiner* — Toan C To
(74) *Attorney, Agent, or Firm* — Vivacqua Crane, PLLC

(57) ABSTRACT

A method of actively controlling camber offset of a suspension for a vehicle includes, with a system controller, receiving, via a plurality of sensing devices within the vehicle and in communication with the system controller, data related to a target camber angle for the suspension of the vehicle, defining the target camber angle based on the data related to the target camber angle for the suspension of the vehicle, actuating an active camber offset mechanism of the suspension for the vehicle, and adjusting, with the active camber offset mechanism, a camber angle of the suspension to the target camber angle.

20 Claims, 6 Drawing Sheets

(56) References Cited

U.S. PATENT DOCUMENTS

2025/0128762 A1\* 4/2025 Wang ..................... B60G 3/202
2025/0222920 A1\* 7/2025 Funke ............. B60W 30/18145

\* cited by examiner

ACTIVE CAMBER CONTROL

INTRODUCTION

The present invention relates generally to suspension components within a vehicle and control of camber angle.

Current suspension systems force vehicles to compromise between lateral and longitudinal traction optimization. When a vehicle is approaching maximum lateral acceleration, additional camber angle is desired, however, during acceleration near zero camber angle is desired to achieve optimal traction. Further, challenges of packaging various elements in the vehicle force lengths of suspension components to be less than optimal, compromising the suspension kinematics.

Thus, while current methods and systems achieve their intended purpose, there is a need for an improved method of actively controlling camber angle in a vehicle suspension to optimize the camber based on real-time road conditions and vehicle parameters.

SUMMARY

According to several aspects of the present disclosure, a method of actively controlling camber offset of a suspension for a vehicle, includes, with a system controller, receiving, via a plurality of sensing devices within the vehicle and in communication with the system controller, data related to a target camber angle for the suspension of the vehicle, defining the target camber angle based on the data related to the target camber angle for the suspension of the vehicle, actuating an active camber offset mechanism of the suspension for the vehicle, and adjusting, with the active camber offset mechanism, a camber angle of the suspension to the target camber angle.

According to another aspect, the receiving, via the plurality of sensing devices within the vehicle, data related to the target camber angle for the suspension of the vehicle further includes, receiving, via a human machine interface (HMI) in communication with the system controller, a selection, by an operator of the vehicle, of one of a plurality of static camber control modes, and the defining the target camber angle based on the data related to the target camber angle for the suspension of the vehicle further includes accessing a database including a plurality of pre-determined target camber angle values, wherein the database includes a pre-determined target camber angle value for each of the plurality of static camber control modes, and selecting the pre-determined target camber angle value associated with the selected one of the plurality of static camber control modes.

According to another aspect, the receiving, via the plurality of sensing devices within the vehicle, data related to the target camber angle for the suspension of the vehicle further includes receiving, via a human machine interface (HMI) in communication with the system controller, a selection, by an operator of the vehicle, of a dynamic camber control mode, and receiving, via the plurality of sensing devices within the vehicle, data related to a measured ride height offset for the vehicle, and the defining the target camber angle based on the data related to the target camber angle for the suspension of the vehicle further includes defining the target camber angle based on the measured ride height offset for the vehicle.

According to another aspect, the defining the target camber angle based on the measured ride height offset for the vehicle further includes accessing a database including a plurality of pre-determined target camber angle values, wherein the database includes a pre-determined target camber angle value for each of a plurality of ride height offset values, and selecting the pre-determined target camber angle value associated with a one of the plurality of ride height offset values that matches the measured ride height offset of the vehicle.

According to another aspect, the receiving, via the plurality of sensing devices within the vehicle, data related to the target camber angle for the suspension of the vehicle further includes receiving, via the plurality of sensing devices within the vehicle, data related to a road surface on which the vehicle is traveling, and the defining the target camber angle based on the data related to the target camber angle for the suspension of the vehicle further includes calculating a camber angle offset based on the data related to the road surface on which the vehicle is traveling, and applying the calculated camber angle offset to the target camber angle.

According to another aspect, the receiving, via the plurality of sensing devices within the vehicle, data related to the road surface on which the vehicle is traveling further includes receiving data related to a profile of the road surface, and receiving data related to surface conditions of the road surface including the type of road surface and presence of precipitation and/or debris on the road surface, and the calculating the camber angle offset further includes calculating a profile offset based on the data related to the profile of the road surface, calculating a friction offset based on the data related to surface conditions of the road surface, and calculating the camber angle offset based on the calculated profile offset and the calculated friction offset.

According to another aspect, the receiving, via the plurality of sensing devices within the vehicle, data related to the target camber angle for the suspension of the vehicle further includes receiving, via the plurality of sensing devices within the vehicle, data related to projected longitudinal acceleration of the vehicle, projected lateral acceleration of the vehicle and projected yaw of the vehicle, and the defining the target camber angle based on the data related to the target camber angle for the suspension of the vehicle further includes: calculating a projected longitudinal acceleration of the vehicle, a projected lateral acceleration of the vehicle and a projected yaw of the vehicle based on the data related to projected longitudinal acceleration of the vehicle, projected lateral acceleration of the vehicle and projected yaw of the vehicle, and calculating the target camber angle based on the calculated projected longitudinal acceleration, the calculated projected lateral acceleration and the calculated projected yaw.

According to another aspect, the receiving, via the plurality of sensing devices within the vehicle, data related to projected longitudinal acceleration of the vehicle, projected lateral acceleration of the vehicle and projected yaw of the vehicle further includes receiving data related to a position of a steering wheel within the vehicle from a steering wheel position sensor, receiving data related to longitudinal and lateral acceleration of the vehicle from at least one inertial measurement unit, a throttle position sensor and a brake sensor, and receiving data related to a location and orientation of the vehicle from the plurality of sensors within the vehicle, including a global positioning system, radar and lidar.

According to another aspect, the method further includes receiving, via the plurality of sensing devices within the vehicle, real time measured lateral acceleration and yaw of the vehicle, comparing the real time measured lateral acceleration and the real time measured yaw to the projected lateral acceleration and the projected yaw of the vehicle, and when the real time measured lateral acceleration matches the projected lateral acceleration and the real time measured yaw matches the projected yaw, the method includes continuously updating the calculated target camber angle by receiving, via the plurality of sensing devices within the vehicle, data related to projected longitudinal acceleration of the vehicle, projected lateral acceleration of the vehicle and projected yaw of the vehicle, calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle, and calculating the updated target camber angle based on the calculated projected longitudinal acceleration, the calculated projected lateral acceleration and the calculated projected yaw.

According to another aspect, when the real time measured lateral acceleration does not match the projected lateral acceleration and the real time measured yaw does not match the projected yaw, the method includes adjusting, with the active camber offset mechanism, the camber of the suspension to accommodate for the real time measured lateral acceleration and the real time measured yaw, and continuously updating the calculated target camber angle by receiving, via the plurality of sensing devices within the vehicle, data related to projected longitudinal acceleration of the vehicle, projected lateral acceleration of the vehicle and projected yaw of the vehicle, calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle, and calculating the updated target camber angle based on the calculated projected longitudinal acceleration, the calculated projected lateral acceleration and the calculated projected yaw.

According to another aspect, the defining the target camber angle based on the data related to the target camber angle for the suspension of the vehicle further includes defining a target camber angle for each of a plurality of wheels of the vehicle, the actuating an active camber offset mechanism of the suspension for the vehicle further includes, for each of the plurality of wheels, actuating an active camber offset mechanism of the suspension for the wheel, and the adjusting, with the active camber offset mechanism, the camber of the suspension to the target camber angle further includes, for each of the plurality of wheels, adjusting, with the active camber offset mechanism of the suspension for the wheel, the camber of the wheel to the target camber angle for the wheel.

According to several aspects of the present disclosure, a system for actively controlling camber offset of a suspension for a vehicle, includes a system controller adapted to receive, via a plurality of sensing devices within the vehicle and in communication with the system controller, data related to a target camber angle for the suspension of the vehicle, define the target camber angle based on the data related to the target camber angle for the suspension of the vehicle, actuate an active camber offset mechanism of the suspension for the vehicle, and adjust, with the active camber offset mechanism, a camber angle of the suspension to the target camber angle.

According to another aspect, when receiving, via the plurality of sensing devices within the vehicle, data related to the target camber angle for the suspension of the vehicle the system controller is further adapted to receive, via a human machine interface (HMI) in communication with the system controller, a selection, by an operator of the vehicle, of one of a plurality of static camber control modes, and when defining the target camber angle based on the data related to the target camber angle for the suspension of the vehicle the system controller is further adapted to access a database including a plurality of pre-determined target camber angle values, wherein the database includes a pre-determined target camber angle value for each of the plurality of static camber control modes, and select the pre-determined target camber angle value associated with the selected one of the plurality of static camber control modes.

According to another aspect, when receiving, via the plurality of sensing devices within the vehicle, data related to the target camber angle for the suspension of the vehicle the system controller is further adapted to receive, via a human machine interface (HMI) in communication with the system controller, a selection, by an operator of the vehicle, of a dynamic camber control mode, and receive, via a plurality of sensing devices within the vehicle, data related to a measured ride height offset for the vehicle, and when defining the target camber angle based on the data related to the target camber angle for the suspension of the vehicle the system controller is further adapted to define the target camber angle based on the measured ride height offset for the vehicle.

According to another aspect, when defining the target camber angle based on the measured ride height offset for the vehicle the system controller is further adapted to access a database including a plurality of pre-determined target camber angle values, wherein the database includes a pre-determined target camber angle value for each of a plurality of ride height offset values, and select the pre-determined target camber angle value associated with a one of the plurality of ride height offset values that matches the measured ride height offset of the vehicle.

According to another aspect, when receiving, via the plurality of sensing devices within the vehicle, data related to the target camber angle for the suspension of the vehicle the system controller is further adapted to receive data related to a profile of the road surface, and receive data related to surface conditions of the road surface including the type of road surface and presence of precipitation and/or debris on the road surface, and when defining the target camber angle based on the data related to the target camber angle for the suspension of the vehicle the system controller is further adapted to calculate a profile offset based on the data related to the profile of the road surface, calculate a friction offset based on the data related to surface conditions of the road surface, calculate a camber angle offset based on the calculated profile offset and the calculated friction offset, and apply the calculated camber angle offset to the target camber angle.

According to another aspect, when receiving, via the plurality of sensing devices within the vehicle, data related to the target camber angle for the suspension of the vehicle the system controller is adapted to receive, via the plurality of sensing devices within the vehicle, data related to projected longitudinal acceleration of the vehicle, projected lateral acceleration of the vehicle and projected yaw of the vehicle, including data related to a position of a steering wheel within the vehicle from a steering wheel position sensor, data related to longitudinal and lateral acceleration of the vehicle from at least one inertial measurement unit, a throttle position sensor and a brake sensor, and data related to a location and orientation of the vehicle from the plurality of sensors within the vehicle, including a global positioning system, radar and lidar, and when defining the target camber angle based on the data related to the target camber angle for the suspension of the vehicle the system controller is further adapted to calculate a projected longitudinal acceleration of the vehicle, a projected lateral acceleration of the vehicle and a projected yaw of the vehicle based on the data related to projected longitudinal acceleration of the vehicle, projected lateral acceleration of the vehicle and projected yaw of the vehicle, and calculate the target camber angle based on the calculated projected longitudinal acceleration, the calculated projected lateral acceleration and the calculated projected yaw.

According to another aspect, the system controller is further adapted to receive, via the plurality of sensing devices within the vehicle, real time measured lateral acceleration and yaw of the vehicle, compare the real time measured lateral acceleration and the real time measured yaw to the projected lateral acceleration and the projected yaw of the vehicle, and when the real time measured lateral acceleration matches the projected lateral acceleration and the real time measured yaw matches the projected yaw, continuously update the calculated target camber angle by receiving, via the plurality of sensing devices within the vehicle, data related to projected longitudinal acceleration of the vehicle, projected lateral acceleration of the vehicle and projected yaw of the vehicle, calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle, and calculating the updated target camber angle based on the calculated projected longitudinal acceleration, the calculated projected lateral acceleration and the calculated projected yaw.

According to another aspect, when the real time measured lateral acceleration does not match the projected lateral acceleration and the real time measured yaw does not match the projected yaw, the system controller is adapted to adjust, with the active camber offset mechanism, the camber of the suspension to accommodate for the real time measured lateral acceleration and the real time measured yaw, and continuously update the calculated target camber angle by receiving, via the plurality of sensing devices within the vehicle, data related to projected longitudinal acceleration of the vehicle, projected lateral acceleration of the vehicle and projected yaw of the vehicle, calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle, and calculating the updated target camber angle based on the calculated projected longitudinal acceleration, the calculated projected lateral acceleration and the calculated projected yaw.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
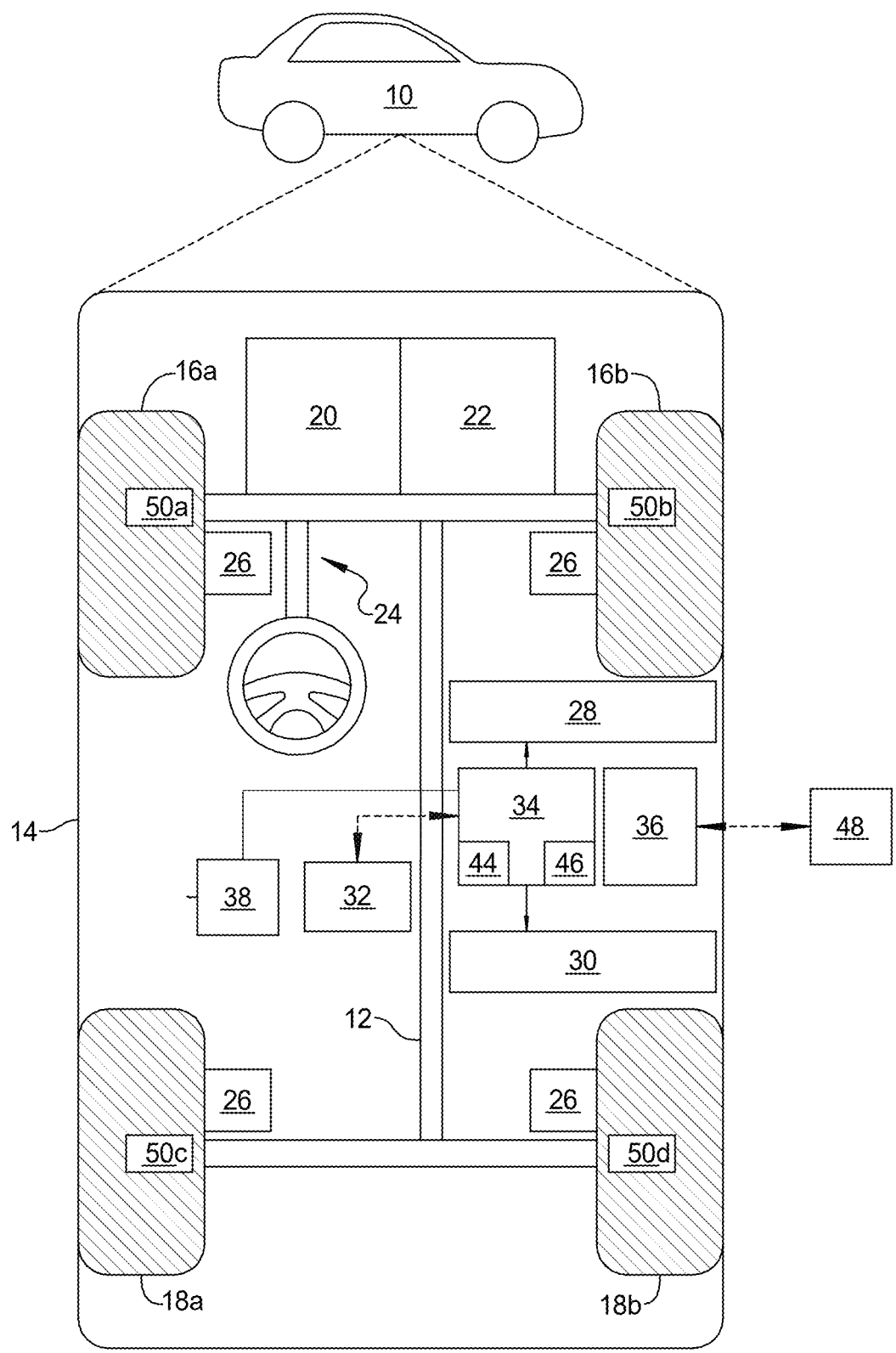
FIG. 1 is a schematic diagram of a vehicle having a suspension in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated system for actively controlling camber angle 76 in a suspension 50 of a vehicle 10 in accordance with various embodiments. In general, the suspension 50 works in conjunction with other systems within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, a transmission oil temperature sensor, and sensors adapted to measure lateral and longitudinal acceleration. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer-readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V"

communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
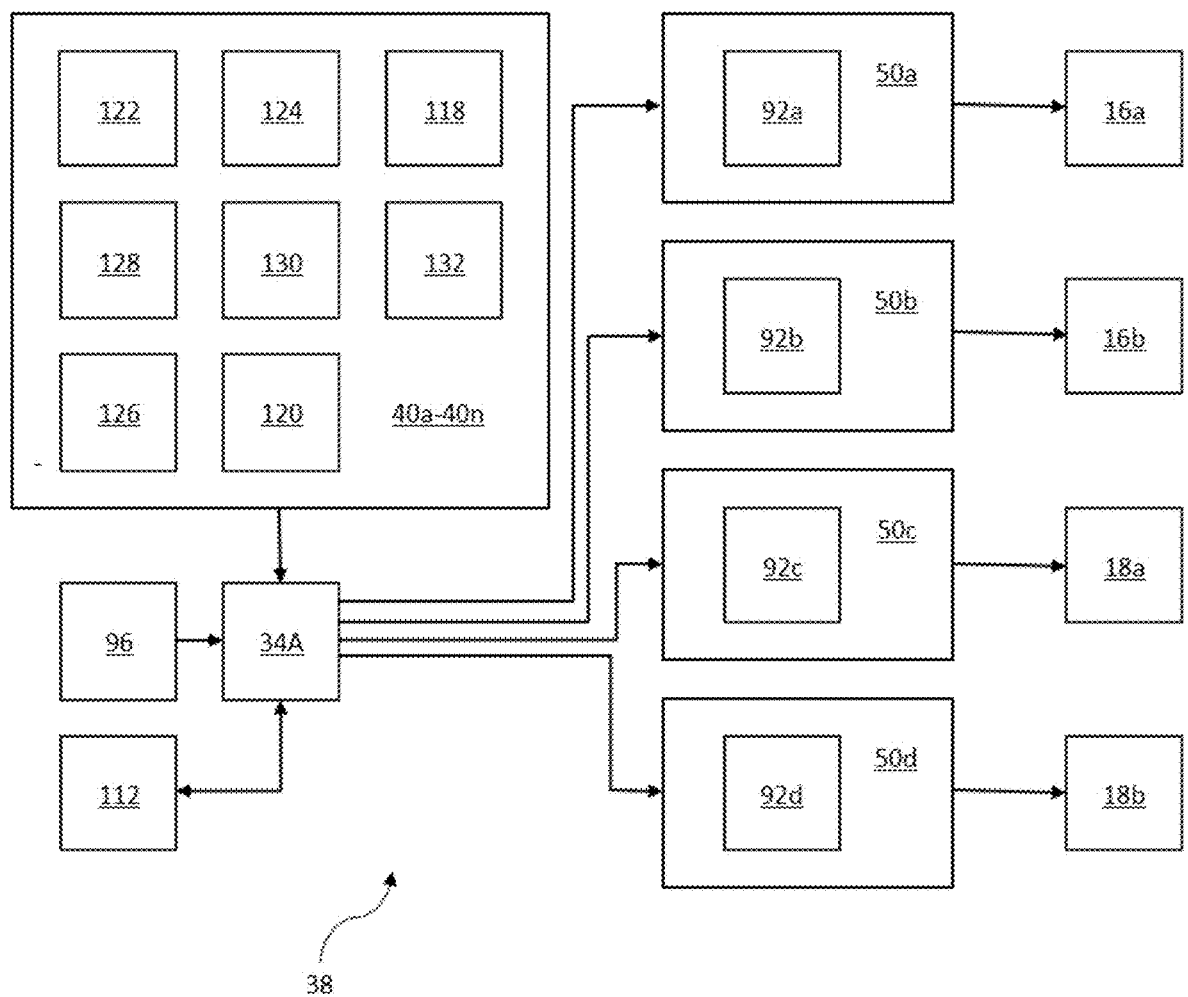
FIG. 2 is a schematic view of a system for controlling the suspension shown in FIG. 1.

Referring to FIG. 2, a system 38 for actively controlling camber offset of a suspension 50 for a vehicle 10 includes a system controller 34A that is adapted to receive, via the plurality of sensing devices 40a-40n within the vehicle 10 and in communication with the system controller 34A, data related to a target camber angle for the suspension 50 of the vehicle 10, define the target camber angle based on the data related to the target camber angle for the suspension 50 of the vehicle 10, actuate an active camber offset mechanism 92 of the suspension 50 for the vehicle 10, and adjust, with the active camber offset mechanism 92, the camber angle 76 of the suspension 50 to the target camber angle.

As shown in FIG. 1, the vehicle 10 is equipped with four wheels (two front wheels 16a, 16b, two rear wheels 18a, 18b). Referring to FIG. 2, each wheel 16a, 16b, 18a, 18b includes an associated suspension 50a, 50b, 50c, 50d that supports the associated wheel 16a, 16b, 16c, 16d on the chassis 12 and includes an active camber offset mechanism 92a, 92b, 92c, 92d, such that the camber angle 76 of each wheel 16a, 16b, 18a, 18b of the vehicle 10 can be individually controlled. The suspension 50a, 50b, 50c, 50d and active camber offset mechanism 92a, 92b, 92c, 92d at each of the four wheels 16a, 16b, 18a, 18b are identical. Thus, for purposes of description, the following paragraphs will describe the suspension(s) 50a, 50b, 50c, 50d (suspension 50) and active camber offset mechanism(s) 92a, 92b, 92c, 92d (active camber offset mechanism 92) singularly.

Figure 3:
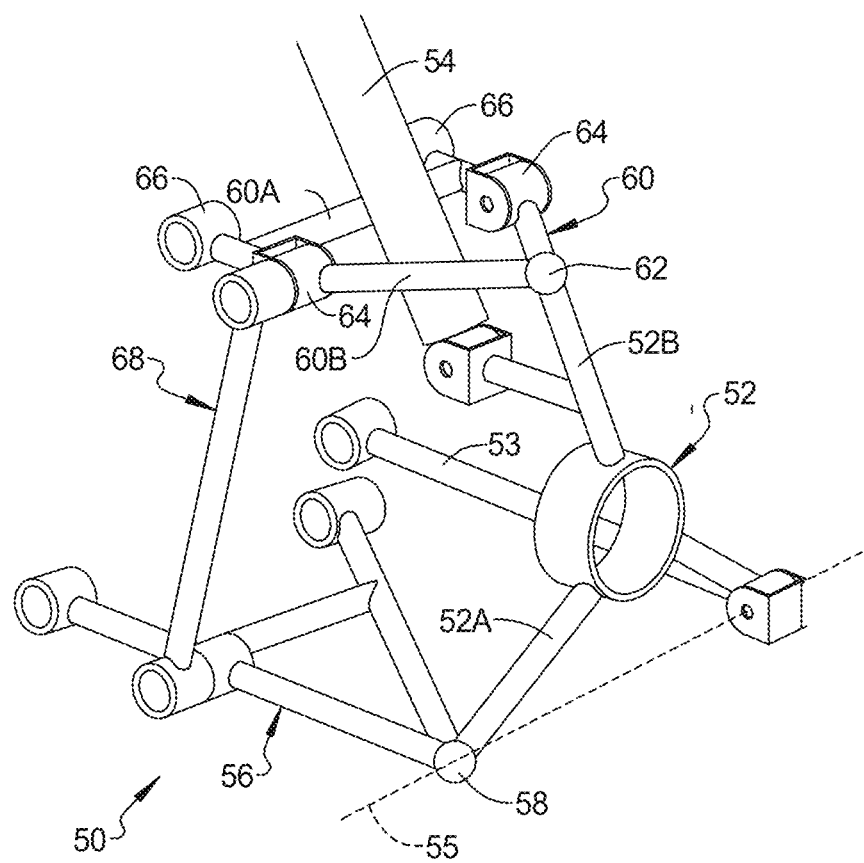
FIG. 3 is a schematic view of a suspension according to an exemplary embodiment of the present disclosure.

Referring to FIG. 3, the suspension 50 for the vehicle 10, includes a knuckle 52 adapted to support a wheel 16a, 16b, 18a, 18b thereon. The suspension 50 includes various linkages adapted to allow the knuckle 52, and the wheel 16a, 16b, 18a, 18b attached thereto, to move up and down to provide suspension characteristics for the vehicle 10. As shown, a shock absorber 54 is connected to the suspension 50 to dampen movement of the knuckle 52 relative to the chassis 12.

A lower control arm 56 interconnects a lower portion 52A of the knuckle 52, at a lower connection point 58, to a structural member (the chassis 12) of the vehicle 10. The lower control arm 56 is pivotally connected to the chassis 12 of the vehicle 10 and pivotally connected to the lower portion 52A of the knuckle 52. An upper control arm 60 interconnects an upper portion 52B of the knuckle 52 to the chassis 12 of the vehicle 10 and includes an inner segment 60A and an outer segment 60B. The inner segment 60A of the upper control arm 60 is pivotally connected to the chassis 12 of the vehicle 10, the outer segment 60B of the upper control arm 60 is connected to the upper portion 52B of the knuckle 52 at an upper connection point 62, and the inner segment 60A and the outer segment 60B are pivotally connected to one another. As shown, the outer segment 60B of the upper control arm 60 has a generally V shape, and is pivotally connected to the inner segment 60A of the upper control arm 60 at two pivotal connection points 64. The inner segment is pivotally connected to the chassis 12 at two pivotal connection points 66.

A camber gain link 68 interconnects the upper control arm 60 and the lower control arm 56. The camber gain link 68 is connected to the upper control arm 60 at one of the pivotal connections 64 of the inner segment 60A and the outer segment 60B. A pivotal position (angular relationship) of the inner segment 60A relative to the outer segment 60B defines a lateral distance between the pivotal connections 66 of the inner segment 60A to the chassis 12 and the upper connection point 62 and, thus, an effective length 70 of the upper control arm 60.

Figure 4A:
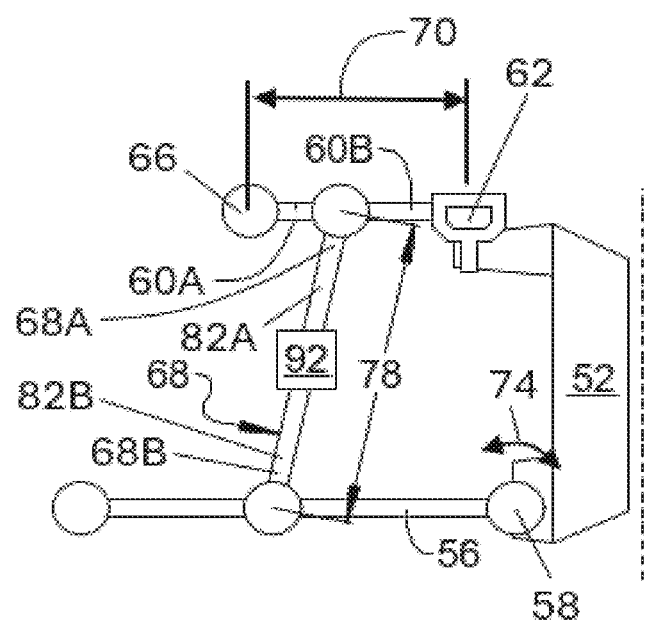
FIG. 4A is a side view of the suspension wherein an active camber offset mechanism holds first and second sections of the camber gain link such that the camber gain link has a first length.
Figure 4B:
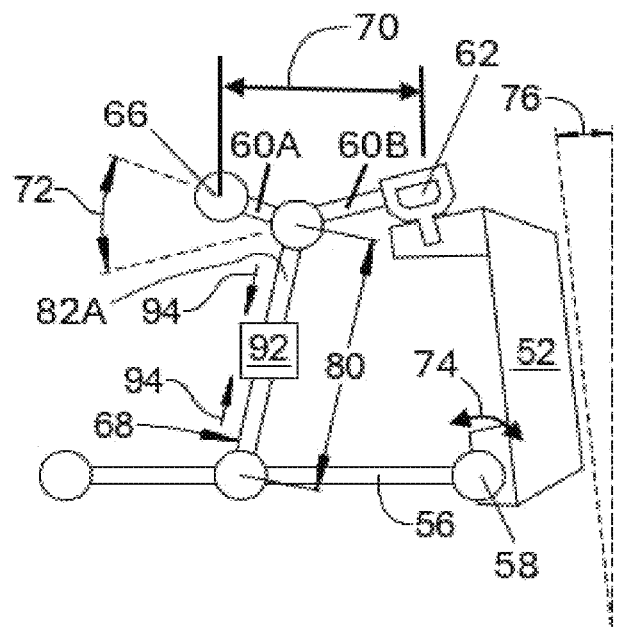
FIG. 4B is a side view of the suspension wherein the active camber offset mechanism holds the first and second sections of the camber gain link such that the camber gain link has a second length.

Referring to FIG. 4A, the inner segment 60A and the outer segment 60B of the upper control arm 60 are co-linear, and thus, the effective length 70 of the upper control arm 60 is maximized. Referring to FIG. 4B, the inner segment 60A and the outer segment 60B of the upper control arm 60 are oriented at an angle 72 relative to one another, thus shortening the lateral distance between the pivotal connections 66 of the inner segment 60A to the chassis 12 and the upper connection point 62, and thus, the effective length 70 of the upper control arm 60.

The knuckle 52 is pivotally moveable about the lower connection point 58, as indicated by arrow 74. Referring again to FIG. 2, as shown, the lower portion 52A of the knuckle is connected to both the lower connection point 58 and to a toe link 53 which interconnects the lower portion 52A of the knuckle 52 to the chassis 12. The knuckle is pivotally moveable about an axis 55 through the lower connection point 58 and the connection of the lower portion 52A of the knuckle 52 to the toe link 53, as indicated by the arrow 74 in FIG. 4A and FIG. 4B. The effective length 70 of the upper control arm 60 defines a camber angle 76 of the knuckle 52. Thus, referring again to FIG. 4A, when the effective length 70 of the upper control arm 60 is maximized, the camber angle 76 of the knuckle 52 is zero, meaning that the knuckle 52, as shown, is vertical. Referring again to FIG. 4B, when the effective length 70 of the upper control arm 60 is reduced, the upper portion 52B of the knuckle 52 is pulled inward, and the camber angle 76 of the knuckle 52 is more than zero, and the knuckle 52 is tilted inward toward the vehicle 10 (negative camber). In an exemplary embodiment, when the effective length 70 of the upper control arm 60 is maximized, the camber angle 76 of the knuckle 52 is not zero, but rather, the knuckle 52 is tilted outward away from the vehicle 10 (positive camber).

The camber gain link 68 is adapted to secure the pivotal connection points 64 of the inner segment 60A and the outer segment 60B and prevent pivotal movement of the inner segment 60A and the outer segment 60B relative to one another, thereby establishing a pivotal position of the inner segment 60A relative to the outer segment 60B, and the effective length 70 of the upper control arm 60 and the camber angle 76 of the knuckle 52.

The way a vehicle's wheels make contact with the road will make a big difference in how the car handles and how it responds to movements in the steering wheel. Small adjustments, such as the camber angle 76, can change responsiveness of a vehicle and can have various benefits and drawbacks. Changing the camber angle 76 is one of the most effective ways to adjust a vehicle suspension. The camber angle 76 is the angle of the wheels 16a, 16b, 18a, 18b in relation to the rest of the chassis 12. The wheels 16a, 16b, 18a, 18b may be angled inward, toward the vehicle 10, or outward, away from the vehicle 10, and both ways can change the feel of the suspension of the vehicle 10.

Negative camber is when the tops of the wheels 16a, 16b, 18a, 18b are angled inward toward the center of the vehicle 10. This means that the bottoms are angled outward and that there is slightly less contact on the road for the inner part of the tires when the vehicle 10 is going straight. This adjustment can change the way the vehicle 10 steers and handles in turns, though, since there will be an increase in the contact patch when the vehicle 10 is cornering. During a turn, the whole vehicle 10 leans, which will decrease the amount of contact between the wheels 16a, 16b, 18a, 18b and the surface of the road if the wheels 16a, 16b, 18a, 18b have a neutral camber (camber angle 76 is zero) and are perfectly straight. If the wheels 16a, 16b, 18a, 18b have a negative camber, this leaning of the vehicle 10 increases the amount of contact between the wheels 16a, 16b, 18a, 18b and the surface of the road, providing better traction. Due to the increase in the contact patch when the vehicle 10 is leaning, negative camber also improves stability at higher speeds and reduces understeer.

However, because a vehicle 10 generally travels in a straight line a majority of the time, negative or positive camber can increase tire wear, negatively affect fuel economy, and the vehicle 10 will have a harsher ride. Thus, it is advantageous to have the ability to selectively alter the effective length 70 of the upper control arm 60 to fine tune the camber characteristics of the vehicle 10.

In an exemplary embodiment, the camber gain link 68 includes a first distal end 68A that is connected to the upper control arm 60 at the pivotal connection 64 of the inner segment 60A and the outer segment 60B, and a second distal end 68B that is connected to the lower control arm 56. Changing a position of the pivotal connection 64 of the inner segment 60A and the outer segment 60B relative to the lower control arm 56, changes the effective length 70 of the upper control arm 60 and the camber angle 76 of the knuckle 52.

Referring again to FIG. 4A, the camber gain link 68 has a first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing zero (neutral) camber angle 76. Referring again to FIG. 4B, the camber gain link 68 has a second length 80, that is shorter than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero camber angle 76, and negative camber.

The active camber offset mechanism 92 connects a first section 82A of the camber gain link 68 and a second section 82B of the camber gain link 68. The active camber offset mechanism 92 is in communication with the system controller 34A that is adapted to automatically actively change the length of the camber gain link 68 based on data collected by the system controller 34A from the plurality of onboard sensors 40A-40B within the vehicle 10. The system controller 34A may be the vehicle controller 34, or may be a separate controller in communication with the system controller 34. Various ones of the plurality of onboard sensors 40a-40n are adapted to monitor and detect vehicle 10 operating conditions, wherein, the system controller 34A uses data from the plurality of onboard sensors 40a-40n to determine an optimum camber angle 76 based on such data.

Figure 5:
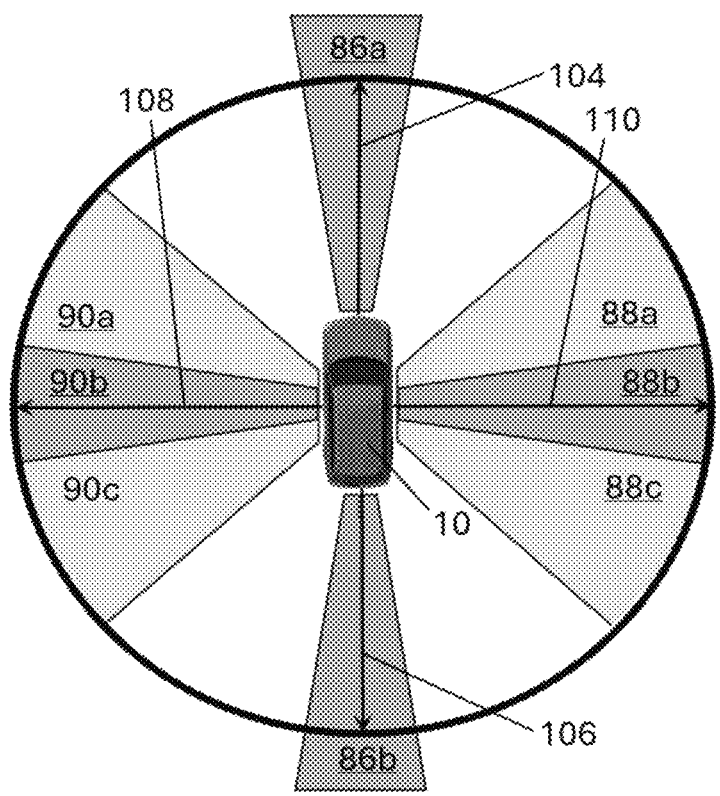
FIG. 5 is a schematic diagram illustrating various camber adjustments under various operating conditions of the vehicle.

Referring to FIG. 5, the use of camber in response to longitudinal and lateral acceleration of the vehicle 10 is graphically illustrated, wherein, the vehicle 10 may be experiencing negative longitudinal acceleration (braking), as indicated by arrow 104, positive longitudinal acceleration (forward acceleration) as indicated by arrow 106, leftward lateral acceleration (right turn), as indicated by arrow 108, and rightward lateral acceleration (left turn), as indicated by arrow 110. During forward and rearward motion of the vehicle 10, during negative and positive longitudinal acceleration, as indicated by arrows 104 and 106, the vehicle experienced very little or no lateral forces/acceleration, and thus, no camber adjustment is required, as indicated by regions 86a, 86b.

As the vehicle 10 enters a left turn, lateral force/acceleration on the vehicle 10 will begin to build, wherein camber adjustments will be made to increase or decrease the camber angle 76, as indicated by the region 88a. When the vehicle is performing a hard left turn, lateral force/acceleration on the vehicle 10 is at its highest level, wherein maximum camber adjustments will be made to increase or decrease the camber angle 76, as indicated by the region 88b. When the vehicle leaves the left turn, beginning to straighten the path of the vehicle 10, the lateral force/acceleration on the vehicle 10 begins to lessen, wherein camber adjustments will be reversed, as indicated by the region 88c.

As the vehicle 10 enters a right turn, lateral force/acceleration on the vehicle 10 will begin to build, wherein camber adjustments will be made to increase or decrease the camber angle 76, as indicated by the region 90a. When the vehicle 10 is performing a hard right turn, lateral force/acceleration on the vehicle 10 is at its highest level, wherein maximum camber adjustments will be made to increase or decrease the camber angle 76, as indicated by the region 90b. When the vehicle 10 leaves the right turn, beginning to straighten the path of the vehicle 10, the lateral force/acceleration on the vehicle 10 begins to lessen, wherein camber adjustments will be reversed, as indicated by the region 90c.

Figure 6:
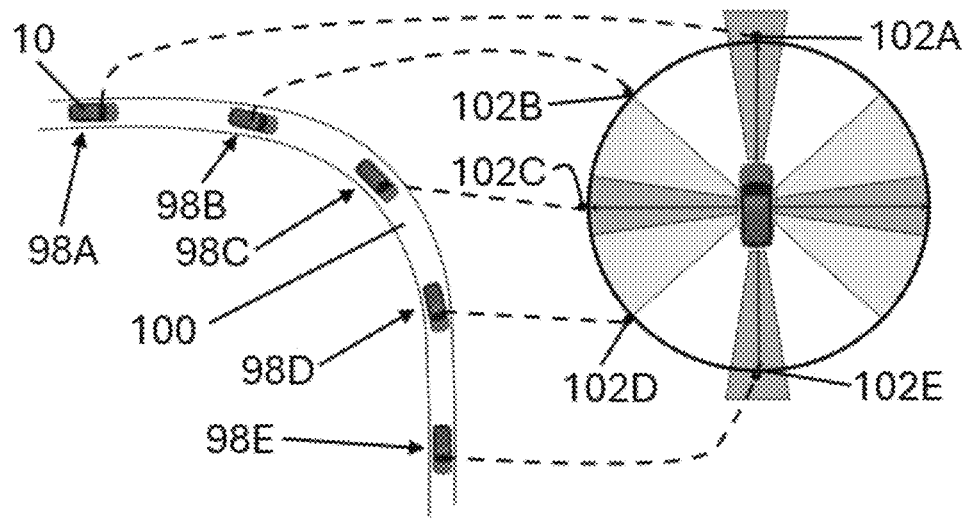
FIG. 6 is a schematic diagram illustrating a vehicle traveling into, through and exiting from a curve within a roadway.

Thus, referring to FIG. 6, for example, when the vehicle 10 is traveling in a straight line, as indicated at point 98A, and approaching a right-handed curve within a roadway 100, the system controller 34A will not actuate the active camber offset mechanism 92 and maintain the first section 82A and the second section 82B in position relative to one another, wherein the camber gain link 68 has a first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing zero (neutral) camber angle 76, as indicated at 102A. Here camber adjustment is zero since there is maximum longitudinal acceleration (braking, slowing down to enter the curve).

As the vehicle 10 enters the curve, at point 98B, the plurality of onboard sensors 40a-40n detects lateral forces beginning to build on the vehicle 10, and sends such data to the system controller 34A, wherein the system controller 34A automatically actuates the active camber offset mechanism 92 to move the first section 82A and the second section 82B, from their relative positions in FIG. 4A, toward one another, as indicated by arrows 94, and holds the first section 82A and the second section 82B in position relative to one another, wherein the camber gain link 68 now has a second length 80, that is shorter than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero camber angle 76, and negative camber, as indicated at 102B. Here camber adjustment is moderate, since the lateral force/acceleration on the vehicle 10 is just beginning to build. As the vehicle 10 continues into the curve the lateral force/acceleration will gradually increase, and the system controller 34A will actuate the active camber offset mechanism 92 to further move the first section 82A and the second section 82B, toward one another, as indicated by arrows 94, and further reducing the effective length 70 of the upper control arm 60, and increasing the camber angle 76 to provide increased negative camber.

As the vehicle 10 begins to exit the curve, at point 98D, the plurality of onboard sensors 40a-40n detects lateral forces beginning to diminish, and sends such data to the system controller 34A, wherein the system controller 34A automatically actuates the active camber offset mechanism 92 to move the first section 82A and the second section 82B, away from one another to begin increasing the effective length 70 of the upper control arm 60 and begin reducing the camber angle 76, and negative camber, as indicated at 102D. Here the camber adjustment is gradually reduced, since the lateral force/acceleration on the vehicle 10 is beginning to diminish. As the vehicle 10 continues out of the curve the lateral force/acceleration will continue to gradually decrease, and the system controller 34A will actuate the active camber offset mechanism 92 to further move the first section 82A and the second section 82B, away from one another, and further increase the effective length 70 of the upper control arm 60, continuously reducing the camber angle 76 at the lateral force/acceleration decreases.

When the vehicle 10 reaches the most severe portion of the curve, at point 98C, the plurality of onboard sensors 40a-40n detects maximum lateral force/acceleration acting on the vehicle 10, and sends such data to the system controller 34A, wherein the system controller 34A automatically actuates the active camber offset mechanism 92 to move the first section 82A and the second section 82B further toward one another, as indicated by arrows 94, to further reduce the effective length 70 of the upper control arm 60, and further increase the camber angle 76, and negative camber, as indicated at 102C. Here camber adjustment is maximized to maximize the lateral acceleration that can be experienced by the vehicle 10 while maintaining contact between the wheel 16a, 16b, 18a, 18b and the road surface.

Finally, when the vehicle 10 has exited the curve and is once again traveling in a straight line, as indicated at point 98E, the system controller 34A will actuate the active camber offset mechanism 92 to bring the first section 82A and the second section 82B in position relative to one another, wherein the camber gain link 68 has the first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing zero (neutral) camber angle 76, as indicated at 102E. Here the camber adjustment is once again zero, maximizing longitudinal acceleration capability as the vehicle accelerates out of the curve.

Thus, the suspension 50 can be tuned by changing, with the active camber offset mechanism 92, the length of the camber gain link 68, wherein, the length of the camber gain link 68 determines the camber angle 76. This allows the system controller 34A to automatically adjust the camber angle 76 depending on data received from the plurality of sensing devices 40a-40n related to specific circumstances.

In various embodiments, the active camber offset mechanism 92 is one of a motor/gear arrangement, an electronic, hydraulic or pneumatic actuator, a linear actuator or solenoid. In an exemplary embodiment, the active camber offset mechanism 92 includes a turnbuckle interconnecting the first section 82A and the second section 82B of the camber gain link 68. The turnbuckle is adapted to rotate upon actuation of the active camber offset mechanism 92. The turnbuckle includes a threaded engagement with each of the first section 82A and the second section 82B, wherein, rotation of the turnbuckle 90 in a first direction (clockwise) will result in movement of the first section 82A and the second section 82B away from each other, and rotation of the turnbuckle 90 in a second direction (counter-clockwise) will result in movement of the first section 82A and the second section 82B toward each other. Thus, by rotation of the turnbuckle 90, the camber angle 76 can be selectively adjusted. The turnbuckle may be rotated by an electronic motor/gear arrangement, hydraulic or pneumatic actuator or any suitable device included within the active camber offset mechanism 92 and adapted to rotate the turnbuckle. It should be understood by those skilled in the art that the active camber offset mechanism 92 may be any suitable device adapted to moveably hold the first section 82A and the second section 82B in position relative to one another.

The active camber offset mechanism 92 is adapted to default to a pre-determined length of the camber gain link 68, wherein, upon failure of any of the plurality of onboard sensors 40a-40n, failure of the system controller 34A, or failure of the active camber offset mechanism 92, the active camber offset mechanism 92 will mechanically default to a pre-determined camber angle 76 that provides reasonable suspension characteristics until the failure can be repaired.

In an exemplary embodiment, when receiving, via the plurality of sensing devices 40a-40n within the vehicle 10, data related to the target camber angle for the suspension 50 of the vehicle 10 the system controller 34A is further adapted to receive, via a human machine interface (HMI) 96 in communication with the system controller 34A, a selection, by an operator of the vehicle 10, of one of a plurality of static camber control modes. A static camber control mode is a mode wherein the operator chooses a camber a static setting, and the system controller 34A does not actuate the active camber offset mechanism 92 under any circumstances. The static camber control modes may include modes such as "Normal", wherein the camber angle is set to a neutral (zero camber angle 76) setting, and held there. Another static control mode may be "Track", where the camber angle 76 is large, providing a significant amount of camber adjustment. This setting would be selected when the vehicle is going to be used for aggressive driving on a track with an inclined surface, or on a road that has many curves and turns.

When an operator chooses, a static control mode, the system controller 34A, when defining the target camber angle based on the data related to the target camber angle for the suspension 50 of the vehicle 10, is further adapted to access a database 112 including a plurality of pre-determined target camber angle values, wherein the database 112 includes a pre-determined target camber angle value for each of the plurality of static camber control modes, and to select the pre-determined target camber angle value associated with the selected one of the plurality of static camber control modes.

In an exemplary embodiment, when receiving, via the plurality of sensing devices 40a-40n within the vehicle 10, data related to the target camber angle for the suspension 50 of the vehicle 10 the system controller 34A is further adapted to receive, via a human machine interface (HMI) 96 in communication with the system controller 34A, a selection, by an operator of the vehicle 10, of a dynamic camber control mode. A dynamic camber control mode is a mode of operation of the system 38 wherein the system controller 34A receives data from the plurality of sensing devices 40a-40n within the vehicle 10 and automatically adjusts the camber angle 76 to maximize contact between the wheels 16a, 16b, 18a, 18b of the vehicle 10 with the road surface, prevent undue wear on the wheels/tires, provide efficient stability and handling characteristics for the vehicle 10.

Figure 7:
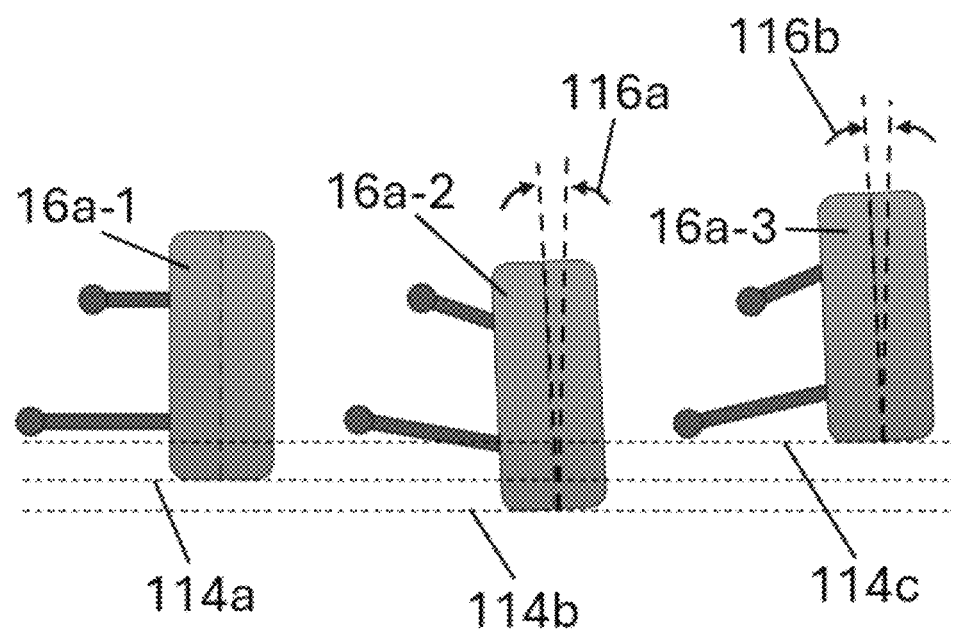
FIG. 7 is a schematic illustration showing a wheel of a vehicle that is not lifted or lowered, a wheel of a vehicle that is lifted and a wheel of a vehicle that is lowered.

In an exemplary embodiment, the system controller 34A receives, via the plurality of sensing devices 40a-40n within the vehicle 10, data related to a measured ride height offset for the vehicle 10. Referring to FIG. 7, when the vehicle 10 is not lifted or lowered, the normal suspension settings will place the wheels 16a, 16b, 18a, 18b flat on the road surface, maximizing the amount of wheel-to-road contact, when the camber is neutral (zero camber angle 76) and the wheels 16a, 16b, 18a, 18b are vertical. In FIG. 7, a first wheel 16a-1 of a vehicle 10 that has not been lifted or lowered is oriented vertically with respect to the chassis 12 of the vehicle 10 and to the road surface 114a. However, a second wheel 16a-2, wherein the vehicle 10 has been lifted, has an altered orientation. By lifting the chassis 12 and body 14 of the vehicle 10 relative to the road surface 114b, the second wheel 16a-2 is now lower relative to the chassis 12, and thus, the suspension 50 causes the second wheel 16a-2 to tilt inward, and an offset angle 116a as the components of the suspension pivot allowing the second wheel 16a-2 to drop relative to the chassis 12. Similarly, a third wheel 16a-3, wherein the vehicle 10 has been lowered, has an altered orientation. By lowering the chassis 12 and body 14 of the vehicle 10 relative to the road surface 114c, the third wheel 16a-3 is now higher relative to the chassis 12, and thus, the suspension 50 causes the third wheel 16a-3 to tilt inward, and an offset angle 116b as the components of the suspension pivot allowing the third wheel 16a-2 to rise relative to the chassis 12.

The plurality of sensing devices 40a-40n measures the vehicle's height using various sensors, for example, using cameras to compare stored images taken at known locations when the vehicle 10 was not lifted or lowered to current images to determine that the vehicle 10 has been lifted or lowered, and by how much (measured ride height offset). The system controller 34A further may use sensors adapted to measure the distance from the senor to the road surface, wherein comparison to previously stored data allows the system controller 34A to detect and measure a difference. When defining the target camber angle based on the data related to the target camber angle for the suspension 50 of the vehicle 10 the system controller 34A is further adapted to define the target camber angle based on the measured ride height offset, and actuate the active camber offset mechanism 92 to adjust the suspension 50 to a new "neutral" position wherein the vehicle wheels 16a-2, 16a-3 are vertically oriented, and hold the suspension 50 there.

In an exemplary embodiment, when defining the target camber angle based on the measured ride height offset for the vehicle 10 the system controller 34A is further adapted to access the database 112 and a plurality of pre-determined target camber angle values, wherein the database 112 includes a pre-determined target camber angle value for each of a plurality of ride height offset values, and select the pre-determined target camber angle value associated with a one of the plurality of ride height offset values that matches the measured ride height offset of the vehicle 10. This saves calculation time, as the system controller 34A, once the rife height offset value has been measured, can pull the corresponding target camber angle value that has been calculated ahead of time, and apply the adjustment to the suspension 50.

In another exemplary embodiment, when receiving, via the plurality of sensing devices 40a-40n within the vehicle 10, data related to the target camber angle for the suspension 50 of the vehicle 10 the system controller 34A is further adapted to receive data related to a profile of the road surface and data related to surface conditions of the road surface including the type of road surface and presence of precipitation and/or debris on the road surface. The plurality of sensing devices 40a-40n detect and measure road profile information including, but not limited to if the road is paved or dirt, angle, crown and tramlining on paved surfaces, as well as detecting the presence and magnitude of precipitation (snow, water, ice, depth) or debris (gravel, etc.) on the surface of the roadway. These things all have an impact on how the wheels 16a, 16b, 18a, 18b contact and engage the surface of the road. When defining the target camber angle based on the data related to the target camber angle for the suspension 50 of the vehicle 10 the system controller 34A is further adapted to calculate a profile offset based on the data related to the profile of the road surface, calculate a friction offset based on the data related to surface conditions of the road surface, calculate a camber angle offset based on the calculated profile offset and the calculated friction offset, and apply the calculated camber angle offset to the target camber angle. Thus, after automatically adjusting the target camber angle for ride height, the system controller 34A further receives data related to the profile of the road surface and the type of road surface and presence of debris to calculate the camber angle offset to automatically accommodate for these factors.

As discussed above, the system controller 34A automatically adjusts the camber angle 76 based on lateral acceleration experienced by the vehicle 10. The system 38 also uses available forward looking data to predict upcoming lateral forces/acceleration to make adjustments to the camber angle 76. In an exemplary embodiment, when receiving, via the plurality of sensing devices 40a-40n within the vehicle 10, data related to the target camber angle for the suspension 50 of the vehicle 10 the system controller 34A is adapted to receive, via the plurality of sensing devices 40a-40n within the vehicle 10, data related to projected longitudinal acceleration of the vehicle 10, projected lateral acceleration of the vehicle 10 and projected yaw of the vehicle 10.

Such data includes data related to a position of a steering wheel within the vehicle 10 from a steering wheel position sensor 118, data related to longitudinal and lateral acceleration of the vehicle 10 from at least one inertial measurement unit 120, a throttle position sensor 122 and a brake sensor 124, and data related to a location and orientation of the vehicle 10 from the plurality of sensors 40a-40n within the vehicle 10, including a global positioning system 126, at least one camera 128, radar 130 and lidar 132. When defining the target camber angle based on the data related to the target camber angle for the suspension 50 of the vehicle 10 the system controller 34A is further adapted to use these sensors 40a-40n, 118-132 to look at the roadway ahead of the vehicle 10, look at the likely trajectory of the vehicle 10, and calculate a projected longitudinal acceleration of the vehicle 10, a projected lateral acceleration of the vehicle 10 and a projected yaw of the vehicle 10 based on the data related to projected longitudinal acceleration of the vehicle, projected lateral acceleration of the vehicle and projected yaw of the vehicle. The system controller 34A calculates the target camber angle based on the calculated projected longitudinal acceleration, the calculated projected lateral acceleration and the calculated projected yaw.

After "looking ahead", and using data from the plurality of sensing devices 40a-40n to calculate and apply the target camber angle based on the projected longitudinal acceleration, the projected lateral acceleration and the projected yaw, the system controller 34A is further adapted to receive, via the plurality of sensing devices 40a-40n within the vehicle 10, real time measured lateral acceleration and yaw of the vehicle 10 and compare the real time measured lateral acceleration and real time measured yaw to the projected lateral acceleration and the projected yaw of the vehicle 10.

When the real time measured lateral acceleration matches the projected lateral acceleration and the real time measured yaw matches the projected yaw, the system controller 34A is adapted to continuously update the calculated target camber angle by receiving, via the plurality of sensing devices 40a-40n within the vehicle 10, data related to projected longitudinal acceleration of the vehicle, projected lateral acceleration of the vehicle and projected yaw of the vehicle 10, calculating a projected longitudinal acceleration of the vehicle 10, a projected lateral acceleration of the vehicle 10 and a projected yaw of the vehicle 10 based on the data related to projected longitudinal acceleration of the vehicle and projected lateral acceleration of the vehicle 10, and calculating an updated target camber angle based on the calculated projected longitudinal acceleration, the calculated projected lateral acceleration and the calculated projected yaw.

Thus, the system controller 34A "looks ahead" and predicts a camber adjustment for the vehicle 10, and when the vehicle 10 reaches the position at which the projected longitudinal acceleration, projected lateral acceleration and projected yaw was calculated, the system controller 34A takes real time measurements of the actual longitudinal acceleration, the actual lateral acceleration and the actual yaw being experienced by the vehicle 10. As long as the real time measurements match the projected values, the system controller 34 proceeds to repeating, on a periodic cycle, calculating a target camber angle based on predicted longitudinal acceleration, lateral acceleration and yaw, adjusting (updating) the camber angle 76 based on the predicted values, and comparing the predicted values to actual real time measurements.

When the real time measured lateral acceleration does not match the projected lateral acceleration and the real time measured yaw does not match the projected yaw, the system controller 34A is adapted to adjust, with the active camber offset mechanism 92, the camber angle 76 of the suspension 50 to accommodate for the real time measured lateral acceleration and the real time measured yaw. After such adjustment, the system controller 34A will proceed with repeating, on a periodic cycle, calculating a target camber angle based on predicted longitudinal acceleration, lateral acceleration and yaw, adjusting (updating) the camber angle 76 based on the predicted values and comparing the predicted values to actual real time measurements, as discussed above.

Figure 8:
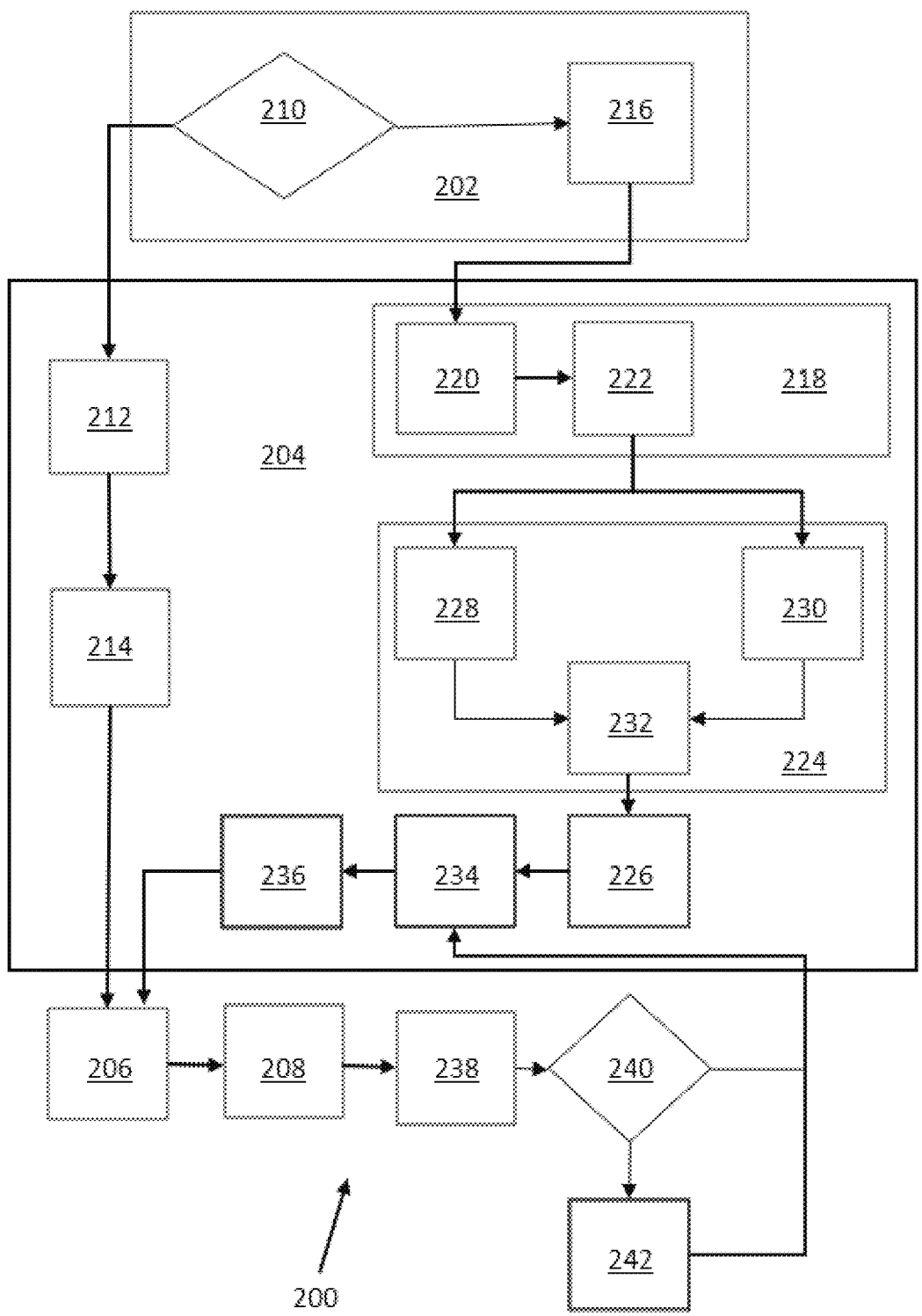
FIG. 8 is a schematic flow chart illustrating a method according to an exemplary embodiment of the present disclosure.

Referring to FIG. 8, a method 200 of actively controlling camber offset of a suspension 50 for a vehicle 10 includes, beginning at block 202, with a system controller 34A, receiving, via a plurality of sensing devices 40a-40n within the vehicle 10 and in communication with the system controller 34A, data related to a target camber angle for the suspension 50 of the vehicle 10, moving to block 204, defining the target camber angle based on the data related to the target camber angle for the suspension 50 of the vehicle 10, moving to block 206, actuating an active camber offset mechanism 92 of the suspension 50 for the vehicle 10, and, moving to block 208, adjusting, with the active camber offset mechanism 92, the camber angle 76 of the suspension 50 to the target camber angle.

In an exemplary embodiment, the receiving, via the plurality of sensing devices 40a-40n within the vehicle 10, data related to the target camber angle for the suspension 50 of the vehicle 10 at block 202 further includes, receiving, via a human machine interface (HMI) 96 in communication with the system controller 34A, a selection, by an operator of the vehicle 10, of one of a plurality of static camber control modes or a dynamic camber control mode, and, the defining the target camber angle based on the data related to the target camber angle for the suspension 50 of the vehicle 10 at block 204 further includes, when, at block 210, a selection of one of the plurality of static camber control modes is selected, moving to block 212, the method 200 includes accessing a database 112 including a plurality of pre-determined target camber angle values, wherein the database 112 includes a pre-determined target camber angle value for each of the plurality of static camber control modes, and, moving to block 214, selecting the pre-determined target camber angle value associated with the selected one of the plurality of static camber control modes.

In another exemplary embodiment, when at block 210, the system controller 34A receives, via the human machine interface (HMI) 96, a selection, by the operator of the vehicle, of a dynamic camber control mode, then, moving to block 216, the method 200 further includes receiving, via the plurality of sensing devices 40a-40n within the vehicle 10, data related to a measured ride height offset for the vehicle 10, and, the defining the target camber angle based on the data related to the target camber angle for the suspension 50 of the vehicle 10 at block 204 further includes, moving to block 218, defining the target camber angle based on the measured ride height offset for the vehicle 10.

In another exemplary embodiment, the defining the target camber angle based on the measured ride height offset for the vehicle 10 at block 218 further includes, moving to block 220, accessing a database 112 including a plurality of pre-determined target camber angle values, wherein the database 112 includes a pre-determined target camber angle value for each of a plurality of ride height offset values, and, moving to block 222, selecting the pre-determined target camber angle value associated with a one of the plurality of ride height offset values that matches the measured ride height offset of the vehicle 10.

In another exemplary embodiment, the receiving, via a plurality of sensing devices 40a-40n within the vehicle 10, data related to the target camber angle for the suspension 50 of the vehicle 10 at block 202 further includes receiving, via the plurality of sensing devices 40a-40n within the vehicle 10, data related to a road surface on which the vehicle 10 is traveling, and the defining the target camber angle based on the data related to the target camber angle for the suspension 50 of the vehicle 10 at block 204 further includes, moving to block 224, calculating a camber angle offset based on the data related to the road surface on which the vehicle 10 is traveling, and, moving to block 226, applying the calculated camber angle offset to the target camber angle.

In another exemplary embodiment, the receiving, via the plurality of sensing devices 40a-40n within the vehicle 10, data related to the road surface on which the vehicle 10 is traveling at block 202 further includes receiving data related to a profile of the road surface, and receiving data related to surface conditions of the road surface including the type of road surface and presence of precipitation and/or debris on the road surface, and the calculating the camber angle offset at block 224 further includes, moving to block 228, calculating a profile offset based on the data related to the profile of the road surface, moving to block 230, calculating a friction offset based on the data related to surface conditions of the road surface, and, moving to block 232, calculating the camber angle offset based on the calculated profile offset and the calculated friction offset.

In another exemplary embodiment, the receiving, via a plurality of sensing devices 40a-40n within the vehicle 10, data related to the target camber angle for the suspension 50 of the vehicle 10 at block 202 further includes, receiving, via the plurality of sensing devices 40a-40n within the vehicle 10, data related to projected longitudinal acceleration of the vehicle, projected lateral acceleration of the vehicle and projected yaw of the vehicle, and the defining the target camber angle based on the data related to the target camber angle for the suspension 50 of the vehicle 10 at block 204 further includes, moving to block 234, calculating a projected longitudinal acceleration of the vehicle 10, a projected lateral acceleration of the vehicle 10 and a projected yaw of the vehicle 10 based on the data related to projected longitudinal acceleration of the vehicle 10, projected lateral acceleration of the vehicle 10 and projected yaw of the vehicle 10, and, moving to block 236, calculating the target camber angle based on the calculated projected longitudinal acceleration, the calculated projected lateral acceleration and the calculated projected yaw.

In another exemplary embodiment, the receiving, via the plurality of sensing devices 40a-40n within the vehicle 10, data related to projected longitudinal acceleration of the vehicle 10, projected lateral acceleration of the vehicle 10 and projected yaw of the vehicle 10 at block 202 further includes receiving data related to a position of a steering wheel within the vehicle 10 from a steering wheel position sensor 118, receiving data related to longitudinal and lateral acceleration of the vehicle 10 from at least one inertial measurement unit 120, a throttle position sensor 122 and a brake sensor 124, and receiving data related to a location and orientation of the vehicle 10 from the plurality of sensors 40a-40n within the vehicle 10, including a global positioning system 126, radar 130 and lidar 132.

In another exemplary embodiment, the method 200 further includes, moving to block 238, receiving, via the plurality of sensing devices 40a-40n within the vehicle 10, real time measured lateral acceleration and yaw of the vehicle 10, and moving to block 240, comparing the real time measured lateral acceleration and the real time measured yaw to the projected lateral acceleration and the projected yaw of the vehicle 10.

When, at block 240, the real time measured lateral acceleration matches the projected lateral acceleration and the real time measured yaw matches the projected yaw, the method 200 includes continuously updating the calculated target camber angle by reverting to block 234 and receiving, via the plurality of sensing devices 40a-40n within the vehicle 10, data related to projected longitudinal acceleration of the vehicle 10, projected lateral acceleration of the vehicle 10 and projected yaw of the vehicle 10, calculating a projected longitudinal acceleration of the vehicle 10, a projected lateral acceleration of the vehicle 10 and a projected yaw of the vehicle 10 based on the data related to projected longitudinal acceleration of the vehicle 10 and projected lateral acceleration of the vehicle, and moving to block 236, calculating the updated target camber angle based on the calculated projected longitudinal acceleration, the calculated projected lateral acceleration and the calculated projected yaw.

When, at block 240, the real time measured lateral acceleration does not match the projected lateral acceleration and the real time measured yaw does not match the projected yaw, the method 200 includes, moving from block 240 to block 242, adjusting, with the active camber offset mechanism 92, the camber of the suspension 50 to accommodate for the real time measured lateral acceleration and the real time measured yaw, after which, the method 200 includes continuously updating the calculated target camber angle by reverting to block 234 and receiving, via the plurality of sensing devices 40a-40n within the vehicle 10, data related to projected longitudinal acceleration of the vehicle 10, projected lateral acceleration of the vehicle 10 and projected yaw of the vehicle 10, calculating a projected longitudinal acceleration of the vehicle 10, a projected lateral acceleration of the vehicle 10 and a projected yaw of the vehicle 10 based on the data related to projected longitudinal acceleration of the vehicle 10 and projected lateral acceleration of the vehicle, and moving to block 236, calculating the updated target camber angle based on the calculated projected longitudinal acceleration, the calculated projected lateral acceleration and the calculated projected yaw.

In another exemplary embodiment, the defining the target camber angle based on the data related to the target camber angle for the suspension 50 of the vehicle 10 at block 202 further includes defining a target camber angle for each of a plurality of wheels 16a, 16b, 18a, 18b of the vehicle 10, the actuating an active camber offset mechanism 92 of the suspension for the vehicle 10 at block 206 further includes, for each of the plurality of wheels 16a, 16b, 18a, 18b, actuating an active camber offset mechanism 92a, 92b, 92c, 92d of the suspension 50a, 50b, 50c, 50d for the wheel 16a, 16b, 18a, 18b, and the adjusting, with the active camber offset mechanism 92, a camber angle 76 of the suspension 50 to the target camber angle at block 208 further includes, for each of the plurality of wheels 16a, 16b, 18a, 18b, adjusting, with the active camber offset mechanism 92a, 92b, 92c, 92d of the suspension 50a, 50b, 50c, 50d for the wheel 16a, 16b, 18a, 18b, the camber angle 76 of the wheel 16a, 16b, 18a, 18b to the target camber angle for the wheel 16a, 16b, 18a, 18b.

A method and system of the present disclosure offers the advantage of allowing easy automatic adjustment of camber angle within the suspension to accommodate different driving conditions or vehicle characteristics.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of actively controlling camber offset of a suspension for a vehicle, comprising, with a system controller:
   receiving, via a plurality of sensing devices within the vehicle and in communication with the system controller, data related to a target camber angle for the suspension of the vehicle, including:
      receiving, via a human machine interface (HMI) in communication with the system controller, a selection, by an operator of the vehicle, of a dynamic camber control mode; and
      receiving, via the plurality of sensing devices within the vehicle, data related to a measured ride height offset for the vehicle;
   defining the target camber angle based on the data related to the target camber angle for the suspension of the vehicle and the measured ride height offset for the vehicle;
   actuating an active camber offset mechanism of the suspension for the vehicle; and
   adjusting, with the active camber offset mechanism, a camber angle of the suspension to the target camber angle.

2. The method of claim 1, wherein the receiving, via the plurality of sensing devices within the vehicle, data related to the target camber angle for the suspension of the vehicle further includes, receiving, via a human machine interface (HMI) in communication with the system controller, a selection, by an operator of the vehicle, of one of a plurality of static camber control modes; and
   the defining the target camber angle based on the data related to the target camber angle for the suspension of the vehicle further includes:
      accessing a database including a plurality of pre-determined target camber angle values, wherein the database includes a pre-determined target camber angle value for each of the plurality of static camber control modes; and
      selecting the pre-determined target camber angle value associated with the selected one of the plurality of static camber control modes.

3. The method of claim 1, wherein the defining the target camber angle based on the measured ride height offset for the vehicle further includes:
   accessing a database including a plurality of pre-determined target camber angle values, wherein the database includes a pre-determined target camber angle value for each of a plurality of ride height offset values; and
   selecting the pre-determined target camber angle value associated with a one of the plurality of ride height offset values that matches the measured ride height offset of the vehicle.

4. The method of claim 3, wherein the receiving, via the plurality of sensing devices within the vehicle, data related to the target camber angle for the suspension of the vehicle further includes receiving, via the plurality of sensing devices within the vehicle, data related to a road surface on which the vehicle is traveling.

5. The method of claim 4, wherein the defining the target camber angle based on the data related to the target camber angle for the suspension of the vehicle further includes:
   calculating a camber angle offset based on the data related to the road surface on which the vehicle is traveling; and
   applying the calculated camber angle offset to the target camber angle.

6. The method of claim 5, wherein:
   the receiving, via the plurality of sensing devices within the vehicle, data related to the road surface on which the vehicle is traveling further includes:
      receiving data related to a profile of the road surface; and
      receiving data related to surface conditions of the road surface including the type of road surface and presence of precipitation and/or debris on the road surface; and
   the calculating the camber angle offset further includes:
      calculating a profile offset based on the data related to the profile of the road surface;
      calculating a friction offset based on the data related to surface conditions of the road surface; and
      calculating the camber angle offset based on the calculated profile offset and the calculated friction offset.

7. The method of claim 6, wherein the receiving, via the plurality of sensing devices within the vehicle, data related to the target camber angle for the suspension of the vehicle further includes receiving, via the plurality of sensing devices within the vehicle, data related to projected longitudinal acceleration of the vehicle, projected lateral acceleration of the vehicle and projected yaw of the vehicle; and
   the defining the target camber angle based on the data related to the target camber angle for the suspension of the vehicle further includes:
      calculating a projected longitudinal acceleration of the vehicle, a projected lateral acceleration of the vehicle and a projected yaw of the vehicle based on the data related to projected longitudinal acceleration of the vehicle, projected lateral acceleration of the vehicle and projected yaw of the vehicle; and
      calculating the target camber angle based on the calculated projected longitudinal acceleration, the calculated projected lateral acceleration and the calculated projected yaw.

8. The method of claim 7, wherein:
   the receiving, via the plurality of sensing devices within the vehicle, data related to projected longitudinal acceleration of the vehicle, projected lateral acceleration of the vehicle and projected yaw of the vehicle further includes:
      receiving data related to a position of a steering wheel within the vehicle from a steering wheel position sensor;
      receiving data related to longitudinal and lateral acceleration of the vehicle from at least one inertial measurement unit, a throttle position sensor and a brake sensor; and
      receiving data related to a location and orientation of the vehicle from the plurality of sensors within the vehicle, including a global positioning system, radar and lidar.

9. The method of claim 8, further including:
   receiving, via the plurality of sensing devices within the vehicle, real time measured lateral acceleration and yaw of the vehicle;

comparing the real time measured lateral acceleration and the real time measured yaw to the projected lateral acceleration and the projected yaw of the vehicle; and when the real time measured lateral acceleration matches the projected lateral acceleration and the real time measured yaw matches the projected yaw, the method includes continuously updating the calculated target camber angle by:

receiving, via the plurality of sensing devices within the vehicle, data related to projected longitudinal acceleration of the vehicle, projected lateral acceleration of the vehicle and projected yaw of the vehicle;

calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle; and calculating the updated target camber angle based on the calculated projected longitudinal acceleration, the calculated projected lateral acceleration and the calculated projected yaw.

10. The method of claim 9, wherein, when the real time measured lateral acceleration does not match the projected lateral acceleration and the real time measured yaw does not match the projected yaw, the method includes:

adjusting, with the active camber offset mechanism, the camber of the suspension to accommodate for the real time measured lateral acceleration and the real time measured yaw; and continuously updating the calculated target camber angle by:

receiving, via the plurality of sensing devices within the vehicle, data related to projected longitudinal acceleration of the vehicle, projected lateral acceleration of the vehicle and projected yaw of the vehicle;

calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle; and calculating the updated target camber angle based on the calculated projected longitudinal acceleration, the calculated projected lateral acceleration and the calculated projected yaw.

11. The method of claim 1, wherein:

the defining the target camber angle based on the data related to the target camber angle for the suspension of the vehicle further includes defining a target camber angle for each of a plurality of wheels of the vehicle;

the actuating an active camber offset mechanism of the suspension for the vehicle further includes, for each of the plurality of wheels, actuating an active camber offset mechanism of the suspension for the wheel; and the adjusting, with the active camber offset mechanism, the camber of the suspension to the target camber angle further includes, for each of the plurality of wheels, adjusting, with the active camber offset mechanism of the suspension for the wheel, the camber of the wheel to the target camber angle for the wheel.

12. A system for actively controlling camber offset of a suspension for a vehicle, comprising, a system controller adapted to:

receive, via a plurality of sensing devices within the vehicle and in communication with the system controller, data related to a target camber angle for the suspension of the vehicle, including:

receive, via a human machine interface (HMI) in communication with the system controller, a selection, by an operator of the vehicle, of a dynamic camber control mode; and receive, via the plurality of sensing devices within the vehicle, data related to a measured ride height offset for the vehicle;

define the target camber angle based on the data related to the target camber angle for the suspension of the vehicle and the measured ride height offset for the vehicle;

actuate an active camber offset mechanism of the suspension for the vehicle; and adjust, with the active camber offset mechanism, a camber angle of the suspension to the target camber angle.

13. The system of claim 12, wherein:

when receiving, via the plurality of sensing devices within the vehicle, data related to the target camber angle for the suspension of the vehicle the system controller is further adapted to receive, via a human machine interface (HMI) in communication with the system controller, a selection, by an operator of the vehicle, of one of a plurality of static camber control modes; and when defining the target camber angle based on the data related to the target camber angle for the suspension of the vehicle the system controller is further adapted to:

access a database including a plurality of pre-determined target camber angle values, wherein the database includes a pre-determined target camber angle value for each of the plurality of static camber control modes; and select the pre-determined target camber angle value associated with the selected one of the plurality of static camber control modes.

14. The system of claim 12, wherein when defining the target camber angle based on the measured ride height offset for the vehicle the system controller is further adapted to:

access a database including a plurality of pre-determined target camber angle values, wherein the database includes a pre-determined target camber angle value for each of a plurality of ride height offset values; and select the pre-determined target camber angle value associated with a one of the plurality of ride height offset values that matches the measured ride height offset of the vehicle.

15. The system of claim 14, wherein:

when receiving, via the plurality of sensing devices within the vehicle, data related to the target camber angle for the suspension of the vehicle the system controller is further adapted to:

receive data related to a profile of the road surface; and receive data related to surface conditions of the road surface including the type of road surface and presence of precipitation and/or debris on the road surface.

16. The system of claim 15, wherein:

when defining the target camber angle based on the data related to the target camber angle for the suspension of the vehicle the system controller is further adapted to:

calculate a profile offset based on the data related to the profile of the road surface;

calculate a friction offset based on the data related to surface conditions of the road surface;

calculate a camber angle offset based on the calculated profile offset and the calculated friction offset; and apply the calculated camber angle offset to the target camber angle.

17. The system of claim 16, wherein:

when receiving, via the plurality of sensing devices within the vehicle, data related to the target camber angle for the suspension of the vehicle the system controller is adapted to receive, via the plurality of sensing devices within the vehicle, data related to projected longitudinal acceleration of the vehicle, projected lateral acceleration of the vehicle and projected yaw of the vehicle, including:

data related to a position of a steering wheel within the vehicle from a steering wheel position sensor;

data related to longitudinal and lateral acceleration of the vehicle from at least one inertial measurement unit, a throttle position sensor and a brake sensor; and data related to a location and orientation of the vehicle from the plurality of sensors within the vehicle, including a global positioning system, radar and lidar; and when defining the target camber angle based on the data related to the target camber angle for the suspension of the vehicle the system controller is further adapted to:

calculate a projected longitudinal acceleration of the vehicle, a projected lateral acceleration of the vehicle and a projected yaw of the vehicle based on the data related to projected longitudinal acceleration of the vehicle, projected lateral acceleration of the vehicle and projected yaw of the vehicle; and calculate the target camber angle based on the calculated projected longitudinal acceleration, the calculated projected lateral acceleration and the calculated projected yaw.

18. The system of claim 17, wherein the system controller is further adapted to:

receive, via the plurality of sensing devices within the vehicle, real time measured lateral acceleration and yaw of the vehicle;

compare the real time measured lateral acceleration and the real time measured yaw to the projected lateral acceleration and the projected yaw of the vehicle; and when the real time measured lateral acceleration matches the projected lateral acceleration and the real time measured yaw matches the projected yaw, continuously update the calculated target camber angle by:

receiving, via the plurality of sensing devices within the vehicle, data related to projected longitudinal acceleration of the vehicle, projected lateral acceleration of the vehicle and projected yaw of the vehicle;

calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle; and calculating the updated target camber angle based on the calculated projected longitudinal acceleration, the calculated projected lateral acceleration and the calculated projected yaw.

19. The system of claim 18, wherein, when the real time measured lateral acceleration does not match the projected lateral acceleration and the real time measured yaw does not match the projected yaw, the system controller is adapted to:

adjust, with the active camber offset mechanism, the camber of the suspension to accommodate for the real time measured lateral acceleration and the real time measured yaw; and continuously update the calculated target camber angle by:

receiving, via the plurality of sensing devices within the vehicle, data related to projected longitudinal acceleration of the vehicle, projected lateral acceleration of the vehicle and projected yaw of the vehicle;

calculating a projected longitudinal acceleration of the vehicle, a projected lateral acceleration of the vehicle and a projected yaw of the vehicle based on the data related to projected longitudinal acceleration of the vehicle and projected lateral acceleration of the vehicle; and calculating the updated target camber angle based on the calculated projected longitudinal acceleration, the calculated projected lateral acceleration and the calculated projected yaw.

20. A vehicle having a system for actively controlling camber offset of a suspension, including a system controller adapted to:

receive, via a plurality of sensing devices within the vehicle and in communication with the system controller, data related to a target camber angle for the suspension of the vehicle, including:

receive, via a human machine interface (HMI) in communication with the system controller, a selection, by an operator of the vehicle, of a dynamic camber control mode; and receive, via the plurality of sensing devices within the vehicle, data related to a measured ride height offset for the vehicle;

define the target camber angle based on the data related to the target camber angle for the suspension of the vehicle and the measured ride height offset for the vehicle;

actuate an active camber offset mechanism of the suspension for the vehicle; and adjust, with the active camber offset mechanism, the camber of the suspension to the target camber angle.

* * * * *